United States Patent [19]
Blanyer

[11] 3,721,859
[45] March 20, 1973

[54] METAL OBJECT SENSOR, PARTICULARLY FOR RAILWAY WHEELS

[75] Inventor: Carl G. Blanyer, Thousand Oaks, Calif.

[73] Assignee: Abex Corporation, New York, N.Y.

[22] Filed: Nov. 29, 1971

[21] Appl. No.: 202,755

[52] U.S. Cl..................317/5, 317/DIG. 2, 246/249
[51] Int. Cl...........................B61l 13/04, B61l 11/08
[58] Field of Search.......317/5, DIG. 2, 146; 246/247

[56] References Cited

UNITED STATES PATENTS

| | | | |
|---|---|---|---|
| 2,492,388 | 12/1949 | Martin | 317/DIG. 2 |
| 2,892,078 | 6/1959 | Orthuber | 246/249 |
| 2,915,699 | 12/1959 | Mierendorf | 317/DIG. 2 |
| 3,161,387 | 12/1964 | Jutier | 317/DIG. 2 |
| 3,086,109 | 4/1963 | Kaehms | 317/146 |
| 3,197,658 | 7/1965 | Byrnes et al. | 317/DIG. 2 |
| 3,210,539 | 10/1965 | Malaquin | 246/249 |
| 3,544,842 | 12/1970 | Yampolsky | 317/5 |
| 3,614,616 | 10/1971 | Bucek et al. | 317/5 |

*Primary Examiner*—L. T. Hix
*Attorney*—James B. Kinzer et al.

[57] ABSTRACT

A sensor for sensing movement of a metal object, such as a railway wheel, along a given path, comprising three sensing coils, all tuned to the same operating frequency, spaced along the path with their axes intersecting the path, and connected in series in three consecutive arms of a pentagon bridge. An oscillator, connected to the remaining two bridge arms, excites the coils at their operating frequency. A metal object moving along the path disturbs the fields of the coils in a sequence depending upon its direction of movement; the direction and velocity of the metal object are indicated in output signals derived by additively combining and synchronously detecting the signal voltages developed at the bridge terminals. In the preferred construction, the two end coils each include a few turns encompassing the central coil to reduce mutual coupling between adjacent coils.

8 Claims, 18 Drawing Figures

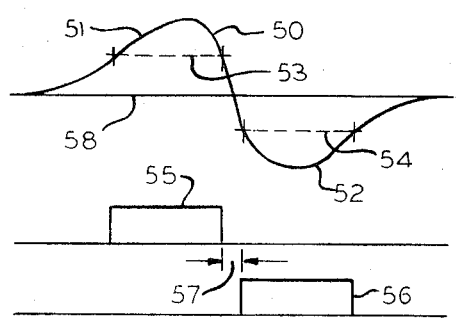
FIG.2A
(CONSTANT SPEED)
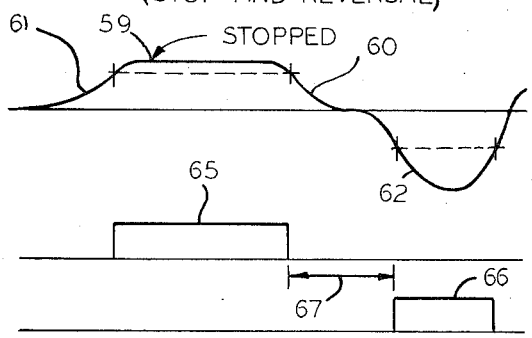
FIG.2B
(STOP AND REVERSAL)
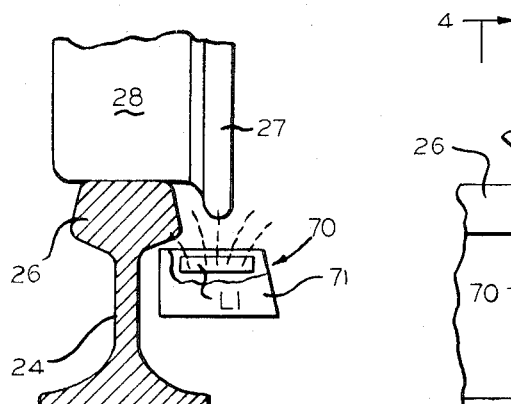
FIG.4
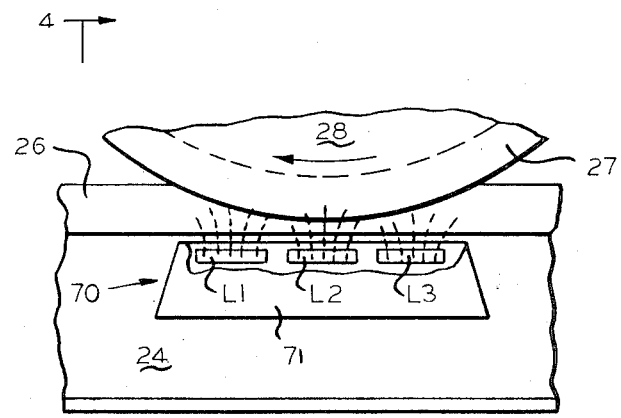
FIG.3
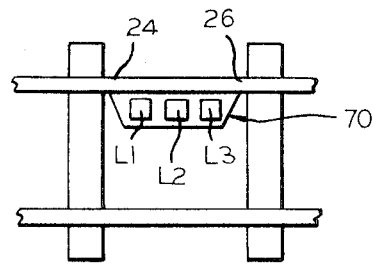
FIG.5
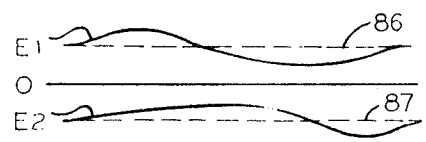
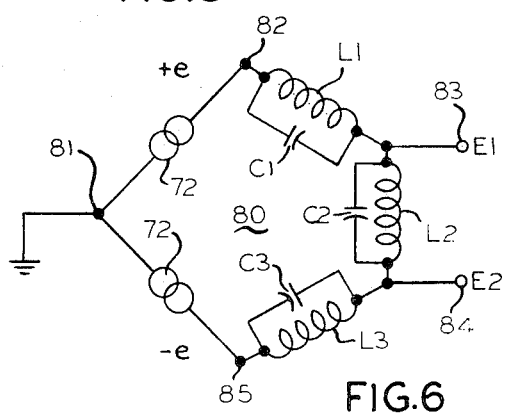
FIG.7
FIG.6
INVENTOR
CARL G. BLANYER
BY
Kinzer, Dorn and Zickert
ATTORNEYS

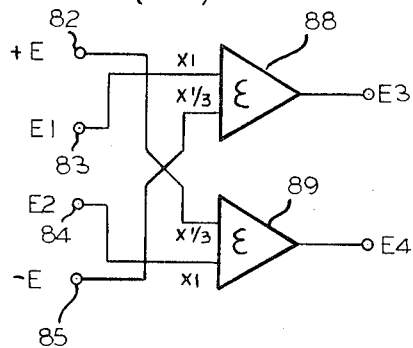
FIG. 8 (SUM)
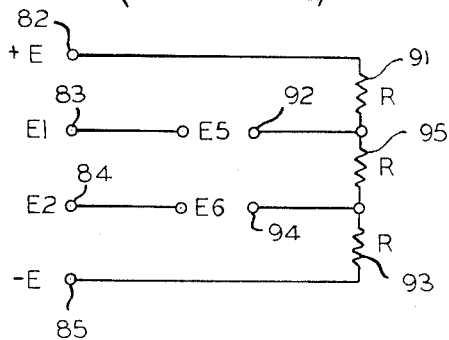
FIG. 9 (DIFFERENTIAL)
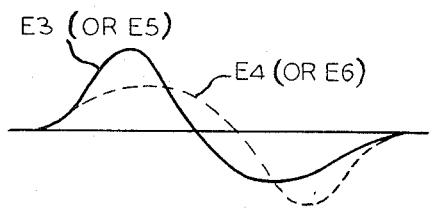
FIG. 10A
DIRECT USE
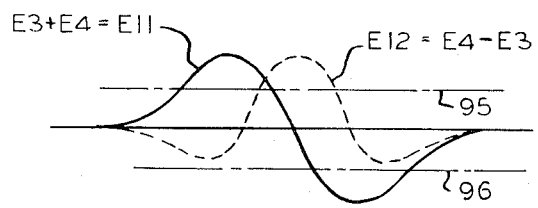
FIG. 10B
SUM AND DIFFERENCE
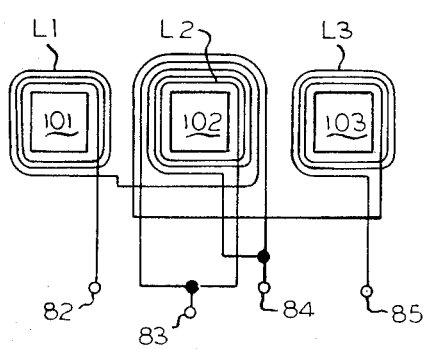
FIG. 11
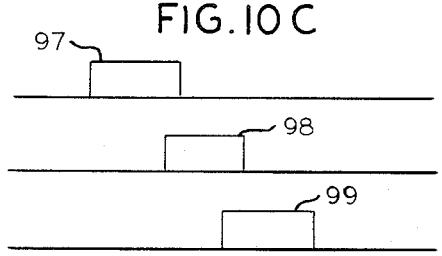
FIG. 10C
RECOGNITION SIGNALS DERIVED FROM FIG.10B
INVENTOR
CARL G. BLANYER

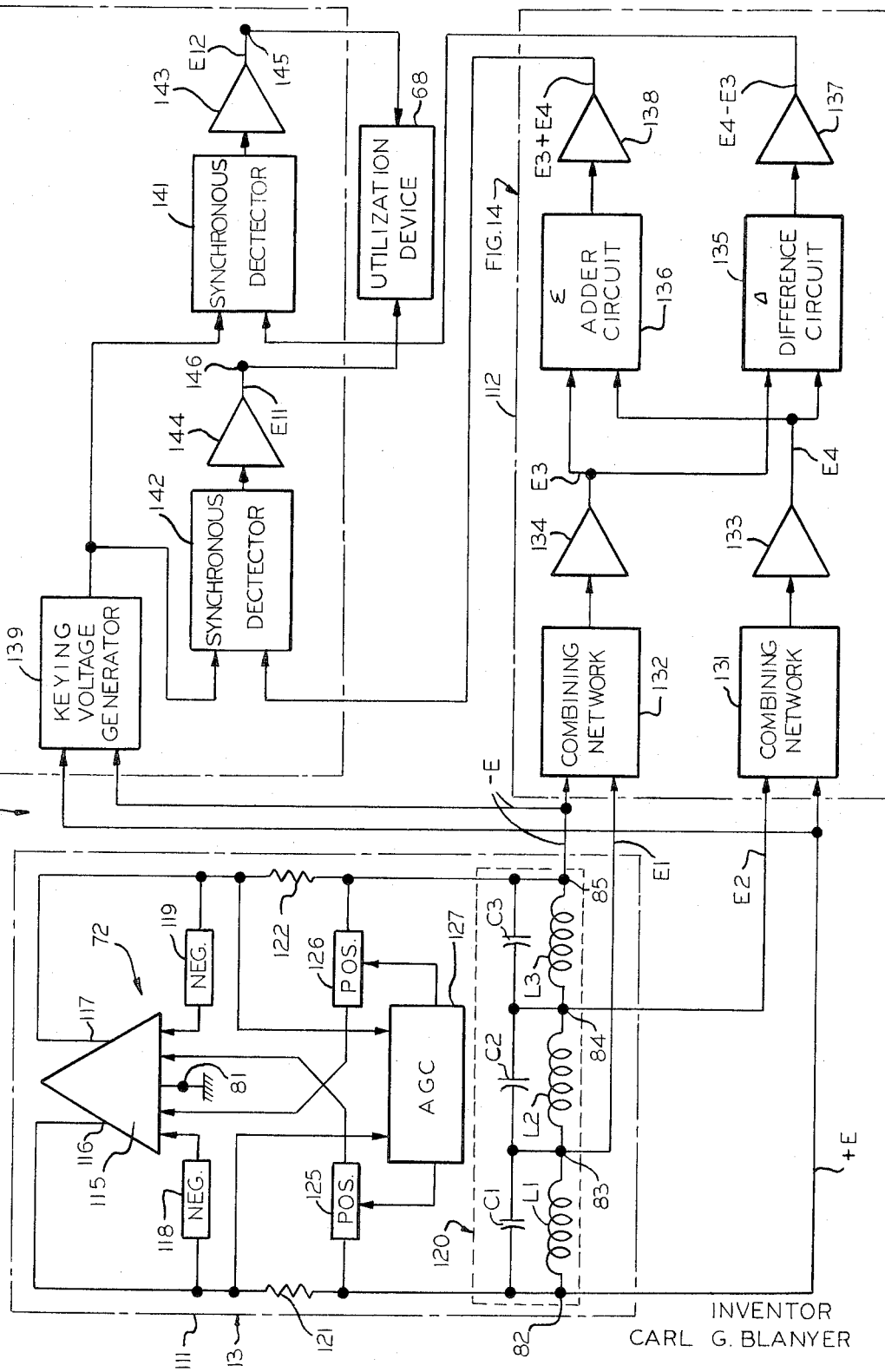

METAL OBJECT SENSOR, PARTICULARLY FOR RAILWAY WHEELS

CROSS REFERENCES TO RELATED APPLICATIONS

The invention covered by this application is an improvement upon the sensor described and claimed in the co-pending application of Carl G. Blanyer, Ser. No. 97,602, filed Dec. 14, 1970. It is directly usable as an input device to the speed detector described and claimed in the co-pending application of Carl G. Blanyer, Ser. No. 141,571, filed May 10, 1971.

BACKGROUND OF THE INVENTION

There are a wide variety of different devices for detecting the movements of metal objects past a given point on a path. In railway operations, for example, sensing devices of this kind may be used to control or actuate many different forms of equipment, including block signals, crossing warnings, hot box detectors, car retarders, and route switching controls for classification yards. Perhaps the most intricate control systems presently in use on railways, requiring the availability of car wheel sensors, are automatic car identification systems.

Another proposed system, which may or may not include automatic car identification, is a complete car-train monitor, adapted for either main line or yard usage, that controls the railway operation in virtually all respects. Such car monitor systems require specific timing information regarding the passage of each individual wheel under any and all operating conditions. These conditions include a wide range of car and train speeds, from over 100 miles per hour down to zero. Indeed, what amount to negative speeds must be accommodated, encompassing situations of start-stop-reverse operations where reversal could occur precisely at the wheel sensor location. The wheel sensor must accommodate both directions of motion and must identify the direction in which the detected wheel is moving. Discrimination must be quite exacting in order to permit effective timing measurements to establish the speed of wheel movement. At the same time, the wheel sensor itself must be physically small enough to permit installation in high density yards and in other locations where space is at a premium.

Other uses for moving metal object sensors occur in a variety of industrial applications, many of which are not closely related to railway operations. Indeed, applications occur even in the field of sports; detection of the speed of a club head moving past a tee has been proposed as a diagnostic and teaching aid in connection with the game of golf.

Many of the wheel sensors or other moving object sensors known in the art function basically as metal-detectors, in which a metal mass alters the permeability of an electromagnetic field. Some have used static magnetic fields; others have employed alternating current fields of various frequencies. The obvious expedient of utilizing physical contact and displacement or deformation of a sensor element has proved unsatisfactory for many sensor units; direct contact devices are subject to unduly rapid wear and are too slow for high speed applications.

Conventional magnetically actuated wheel sensors present a number of problems. The wheel sensors tend to be unduly sensitive to both axial and vertical wheel displacement, resulting from car dynamics and compounded by wide variations in the geometry of new and worn wheels of different types, which cause large variations in signal amplitude and waveform in the outputs of the wheel sensors, often resulting in the development of ambiguous signals. The prior art devices also tend to be unduly sensitive to speed variations. The total electrical output of a wheel sensor is typically the combination of several stimuli, only one of which is intended, often producing indeterminate operational results. In particular, some wheels and truck parts become partially magnetized in service, producing erroneous outputs from known wheel sensor apparatus. Other wheel sensors are dependent upon at least a minimal degree of movement by the wheel and are virtually useless at zero speed.

Electrical interference produces substantial problems in the operation of many different forms of wheel sensor. The common sources of such interference are lightning, signal currents in the railway rails, and the electrical fields of machinery mounted on locomotives and railway cars. Often, the wheel sensors must be critically adjusted and balanced, either mechanically or electrically, or both, affording a continuing and difficult maintenance problem.

One particularly effective metal object sensor, employed primarily as a railway wheel sensor but applicable to other environments, is described in the aforementioned Blanyer application Ser. No. 97,602. That device employs two tuned pick-up coils of large surface area, spaced longitudinally of a path along which a railway wheel or other metal object moves with the axes of the coils intersecting the path. The coils are connected in a bridge circuit excited by a high frequency signal, producing electromagnetic fields that are disturbed by the passage of a metal object. A synchronous detector is coupled to the bridge and to the excitation source, producing output signals that may be interpreted to establish both the direction of movement and the velocity of movement of the metal object; speed and directional detection equipment of a preferred form, based on the signals from the bridge, is described in the aforementioned Blanyer application Ser. No. 141,571.

Under some operational circumstances, however, the sensor of the earlier Blanyer application may produce erroneous signals. Thus, if a wheel or other metal object moves into the field space adjacent the sensor, stops in alignment with the sensor, and then reverses its original direction of movement in leaving the sensor, the directional information derived from the output of the sensor may be incorrect, or at least ambiguous. On the other hand, if the detection system misses the initial output signal from the sensor, the system may interpret the direction of movement of the metal object incorrectly. In many applications, particularly railway applications, errors of this kind, even though infrequent, may be potentially dangerous.

SUMMARY OF THE INVENTION

It is a principal object of the present invention, therefore, to provide a new and improved sensor for detecting the passage of a metal object along a given path that inherently and effectively eliminates or minimizes the problems and difficulties of previously known sensing apparatus as discussed above.

Another object of the invention is to provide a new and improved sensor for detecting the movement of a metal object, such as a railway wheel, that provides accurate information regarding both speed and direction of movement along the path even in those instances in which the first signal relating to a series of moving objects is not effectively developed in the sensing equipment.

An additional object of the invention is to provide a new and improved metal object sensor, suitable for railway wheel sensing applications and other applications, that can correctly detect the occurrence of an interruption of motion at the immediate location of the sensor, followed by a resumption of motion either in the original direction along the path or in the opposite direction.

Another object of the invention is to provide a new and improved railway wheel sensor capable of operation under virtually all ambient conditions, yet which is quite small and compact and is thoroughly compatible with existing trackside equipment, with no interference with normal use of the track.

A further object of the invention is to provide a new and improved sensor for moving metal objects that operates over a wide range of speeds and that can accommodate substantial differences in the geometry of the moving objects being sensed.

Accordingly, the invention relates to a sensor for sensing the passage of a metal object, such as a railway wheel, moving along a given path. The sensor comprises three electrical sensing coils, all tuned to the same operating frequency, electrically connected in series with each other in three consecutive arms of a pentagon bridge, the sensing coils being positioned sequentially along the path with their axes intersecting the path. Excitation means is incorporated in the two remaining arms of the bridge to apply an excitation signal, at the operating frequency, in phase opposition to the two end sensing coils of the series so that each sensing coil develops an electromagnetic field intersecting the path. Signal processing means, connected to the two bridge terminals intermediate the sensing coils, additively combines the signal voltages developed at different terminals of the bridge to produce at least two intermediate signals having amplitude variations indicative of the sequence of disturbance of the fields of the sensing coils when a metal object moves along the portion of the path immediately adjacent the sensor. Synchronous detector means, coupled to the signal processing means and to the excitation means, demodulate the intermediate signals to produce at least two output signals identifying both the direction of movement and the speed of the metal object.

BRIEF DESCRIPTION OF THE DRAWINGS

FIGS. 2A and 2B are diagrams illustrating the output waveforms produced by the sensor of FIG. 1 under specific operating conditions;

FIG. 3 is a side elevation view illustrating the mounting of the sensing coils in a sensor constructed in accordance with the present invention, as applied to a railway wheel sensing application;

FIG. 4 is a sectional view taken approximately as indicated by line 4—4 in FIG. 3;

FIG. 5 is a plan view of the sensing coils for the sensor of FIGS. 3 and 4;

FIG. 6 is a schematic diagram of the basic electrical bridge circuit used for the sensing coils in the sensor of FIGS. 3–5;

FIG. 7 is a graphic illustration of the waveforms for the output signals of the bridge circuit of FIG. 6;

FIG. 8 is a schematic diagram of one circuit which may be utilized in processing the output signals from the bridge of FIG. 6;

FIG. 9 is a schematic diagram of an alternate circuit that may be utilized in processing the output signals from the bridge circuit of FIG. 6;

FIG. 10A is a waveform diagram utilized to explain the output waveforms derived from the processing circuits of FIGS. 8 and 9;

FIGS. 10B and 10C are waveform diagrams illustrating a preferred utilization of the output signals from the processing circuits of FIGS. 8 and 9;

FIG. 11 is a schematic diagram illustrating the preferred manner for winding of the sensing coils to minimize mutual coupling;

FIG. 12 is a block diagram, partially schematic, of a complete sensor constructed in accordance with a preferred embodiment of the present invention.

DESCRIPTION OF THE PREFERRED EMBODIMENTS

Figure 1:
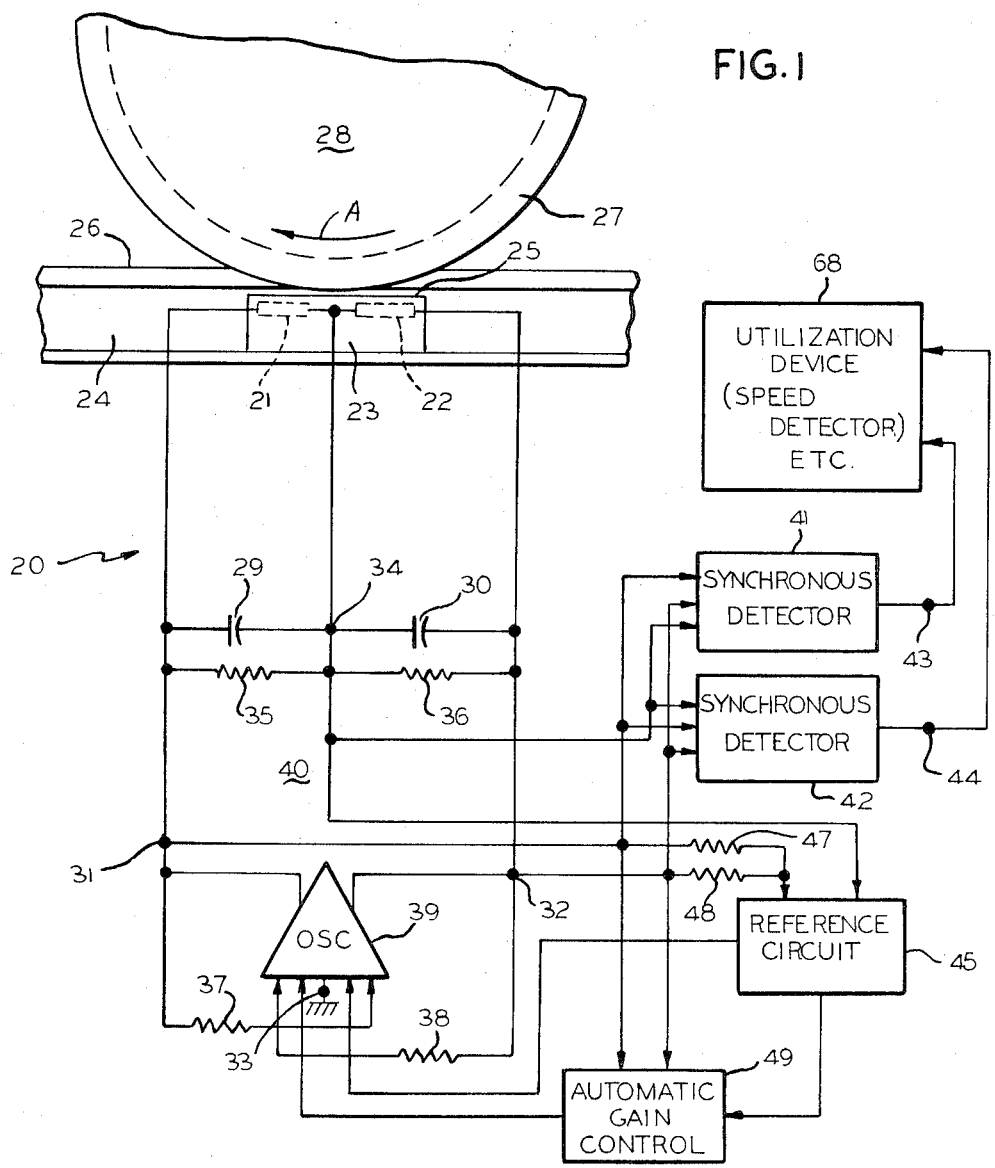
FIG. 1 is a schematic diagram of a railway wheel sensor constructed in accordance with the disclosure of the aforementioned Blanyer application Ser. No. 97,602.

The Prior Blanyer Sensor (FIGS. 1, 2A and 2B)

For a complete understanding of the operational characteristics and advantages of the present invention, it is first desirable to consider the construction and operation of the earlier sensor disclosed and claimed in Blanyer application Ser. No. 97,602, as illustrated in FIG. 1. The wheel sensor 20 shown in FIG. 1 comprises two matched electrical sensing coils 21 and 22 mounted in the upper portion of a non-magnetic housing 23 that is in turn mounted upon the lower flange of a railway rail 24. The upper surface 25 of housing 23 is disposed below the head 26 of rail 24, low enough to clear the flange 27 of a railway wheel 28 moving along the rail. Each of the two coils 21 and 22 has a relatively large surface area; the axes of the two coils are vertically oriented so that their electromagnetic fields extend upwardly from housing 23 into the space traversed by flange 27 as wheel 28 moves along rail 24.

Sensing coils 21 and 22 are both tuned to the same operating frequency; a turning capacitor 29 is connected in parallel with coil 21 and a capacitor 30 is connected in parallel with coil 22. The sensing coils are connected in adjacent arms of a bridge circuit 70 having terminals 31, 32 33 and 34. Two damping resistors 35 and 36 are connected in parallel with coils 21 and 22, respectively. Bridge circuit 40 includes a resistor 37 connected from terminal 31 to one input of an oscillator-amplifier 39 and a corresponding resistor 38 connected from terminal 32 to another input to amplifier 39. The bridge terminal 33 is the common terminal of amplifier 39.

Sensor 20 further comprises a first synchronous detector 41 having inputs connected to bridge terminals 31, 32, and 34 respectively. A second synchronous detector 42 also has three inputs connected to bridge terminals 31, 32 and 34. Synchronous detectors 41 and 42 constitute the output stages of sensor 20, affording output terminals 43 and 44 respectively, connected to a utilization device 68.

Sensor 20 further comprises a reference circuit 45 having one input connected to bridge terminal 34. A second input to reference circuit 45 is taken from bridge terminal 31, through a resistor 47. This same input to the reference circuit is also connected to bridge terminal 32 through a resistor 48. Reference circuit 45 has one output connected to oscillator-amplifier 39 and another output connected to an automatic gain control circuit 49. AGC circuit 49 has input connections taken from bridge terminals 31 and 32 and an output connection back to oscillator 39.

In the operation of sensor 20, the oscillator-amplifier 39 develops a balanced high frequency excitation signal that is supplied in phase opposition to coils 21 and 22 and that is also supplied to synchronous detectors 41 and 42, reference circuit 45, and AGC circuit 49. The excitation signal supplied to coils 21 and 22 causes each coil to develop an electromagnetic field in the space immediately above housing 23. As long as neither of these fields is disturbed, bridge circuit 40 remains essentially balanced and gives no indication of movement of a wheel along rail 24.

As a railway wheel 28 approaches sensor 20, rolling in the direction indicated by arrow A, flange 27 enters the field space above housing 23, disturbing the field of coil 21. (A wheel rolling in the opposite direction would first enter and disturb the field of coil 22.) Further movement of wheel 28 moves flange 27 through the gap between coils 21 and 22 and then into the field of coil 22. Thus, wheel flange 27 initiates unbalanced voltages in coils 21 and 22, in sequence, that can be detected and amplified to afford output signals indicative of movement of the wheel along rail 24.

The normal output from sensor 20, illustrated by curve 50 in FIG. 2A, is neither irregularly variable nor abruptly switching in character. It follows a basic pattern with relatively little variation from wheel to wheel regardless of the state of wear, exact position, or speed of the wheel. The output signal pattern, from the bridge, shows the direction of wheel passage, while the timing of the waveform indicates speed.

When bridge 40 is in its undisturbed state, with no wheel flange in the field space above coils 21 and 22, the signal voltages to detectors 41 and 42 are steady. Taking this voltage as zero (it may be some other steady voltage or it may actually be zero voltage), the signal voltage 50 at the output terminals 43, 44 gradually increases as a wheel enters the field space above the wheel sensor. As the wheel continues its movement and the flange becomes centered over the space between coils 21 and 22, signal voltage 50 decreases at a relative abrupt rate, passes through the zero level, and then increases with the opposite polarity or phase until it achieves approximately the same rough maximum value. In a given circuit, the total voltage swing in either direction, as induced in the coils, may be of the order of about 0.1 volt. As the wheel continues its movement beyond sensor 20, the induced voltage again subsides, somewhat more gradually than during the transitional movement of the wheel past the center of the sensor, until it reaches zero again. The output waveform 50 is repeated for each wheel that passes over sensor 20.

The output signals from bridge 30 are synchronously detected in the detectors 41 and 42. The two detectors each yield an output of first one polarity and then the other. One of these voltages rises as the other falls, and vice versa, affording an effective indication of the direction of wheel movement. In simple non-critical applications, these voltages can be used separately.

In the circuit generally illustrated in FIG. 1, the principal function of reference circuit 45 is to provide a high impedance source of unipotential operating current for the output stages of the oscillator 39. In addition, reference circuit 45 monitors the balance of the bridge input, by means of the auxiliary bridge resistors 47 and 48 and injects a corrective signal back into the oscillator to minimize imbalance. Finally, reference circuit 45 provides a D.C. reference potential for AGC circuit 49.

AGC circuit 49 compares the magnitudes of the oscillator output voltages with the D.C. reference signal received from circuit 45. On the basis of this comparison, the AGC circuit generates a control signal to adjust the overall gain of the oscillator-amplifier 39. Accordingly, the AGC circuit 49 serves as an amplitude regulator for the bridge excitation voltage.

The waveform 50 illustrated in FIG. 2A represents the envelope of the signal produced at the output terminals 43 and 44 of sensor 20 for a wheel passage of relatively constant speed. The two amplitude peaks 51 and 52 follow each other with a sequence that signifies a particular direction of movement for the wheel, in this instance first past coil 21 and then past coil 22. The initial peak 51 terminates before the second signal pulse 52 begins.

Most applications of the sensor output signal require a yes-no decision representative of the two conditions of wheel presence or wheel absence. This decision cannot be made on the basis of departure of the signal from zero because the basic output signal for a wheel-absent condition, line 58 in FIG. 2A, is not necessarily zero. Furthermore, time cannot safely be used as a determinant of the non-zero value that represents a wheel-absent condition, because a wheel may come to a standstill in a position that causes an unbalanced condition in one of the coils, ranging anywhere from negligible to normal maximum, and may remain at standstill for an indefinite period.

Probably the best scheme for utilization of the output 50 from wheel sensor 20 makes use of a threshold phenomenon with the threshold of response set at an appreciable fraction of normal full output. With a system of this kind, a disturbance that is substantial, yet materially less than the usual maximum, must occur before any activity is recognized. This establishes an effective barrier against many false responses, while retaining a tolerance margin for particularly weak true disturbances or low sensitivity. A generally useful value for this threshold of recognition is one-half the normal maximum signal, as represented in FIG. 2A by the dash lines 53 and 54, affording distinct pulse signals 55 and 56.

The threshold recognition circuitry need not be incorporated in the sensor. Indeed, it is often preferable to incorporate the threshold recognition apparatus in the succeeding utilization device 68, such as the speed detector of the aforementioned Blanyer application Ser. No. 141,571. The reasons for incorporation of the threshold recognition function in the utilization device are three-fold. First, effective balance adjustment of the sensor requires observation of any actual imbalance. Second, the optimum threshold value varies with different applications. Third, the threshold effect helps in rejection of noise and variations introduced in transmission from the sensor to the utilization device.

There is a distinct time gap 57 between the output pulses 55 and 56 developed by wheel sensor 20 and its associated utilization apparatus. The time gap 57 is by no means infinitesimal, nor is it insignificant. The time gap for a slow-moving wheel or other metal object is often much longer than the duration of the complete signal for a rapidly moving object. This will be readily apparent when it is considered that the sensor may be required to function for speeds of zero to 100 miles per hour in railroad applications and for similar ranges in other applications.

In a railway wheel sensing operation, a train of many wheels is involved and the effective output from the wheel sensor is a chain of pairs of signals like the pulses 51 and 52, as modified to the waveforms 55 and 56. Each of these pulse pairs contains the information defining the direction of motion and the speed of a given wheel. However, without an elaborate timing mechanism that would be self-adjusting for any speed, there is no certain means available to group isolated signals into appropriate pairs except for detection of the sequence of the very first pair. The latter method suffers from a grave defect in that a false or missed signal invalidates the direction determination and may result in a completely erroneous operation.

FIG. 2B illustrates the signal waveforms for a sequence of operating events that may also produce an erroneous determination with respect to the direction of movement of a wheel, using sensor 20. The waveform 60 illustrated in FIG. 2B shows the result of movement of a wheel into the field of coil 21, with the wheel stopping at a point 59. After a pause, the first wheel moves away from the sensor in the opposite direction from its initial approach, producing the elongated initial pulse 61. Immediately thereafter, a second wheel approaches the sensor, with the train moving in its reversed direction, generating a second pulse 62. The threshold recognition signals developed are indicated by the pulses 65 and 66 separated by the time gap 67. The signal sequence illustrated in FIG. 2B for a stop and reversal is undistinguishable, by any simple means, from the signal sequence illustrated in FIG. 2A for a constant-speed constant-direction wheel movement. This affords a graphic illustration of the difficulty in deriving reliable directional information from the two-signal output afforded by wheel sensor 20. In some applications, this difficulty may be insignificant, particularly if positive steps are taken to preclude halting of a train in the immediate area of the sensor and if continuing maintenance assures identification of the first pulse in each pulse sequence. In other applications, however, the difficulty illustrated by FIGS. 2A and 2B may create the possibility of substantial damage to the trains or other devices controlled in whole or part by the output sensor.

Either of two basic methods can be employed to eliminate the ambiguity in directional sensing inherent in the two coil sensor 20. First, a signal can be developed that is present continuously whenever a wheel is located over sensor 20, whether in the field of coil 21 or of coil 22. Second, a signal can be developed that exists during the transitional time gaps such as the gaps 57 and 67.

The first arrangement for eliminating directional ambiguity could be readily devised, in principle, taking note of the fact that a disturbing wheel is large in comparison with the coil dimensions and spacing in the sensor and acts as a distributed disturbance having at least some influence on both coils during most of the transit time. Thus, the circuit can be arranged to respond to a change in characteristics of either one or both of the coils. An example would be a means for monitoring the total impedance of both coils in series.

But a monitoring arrangement of this kind introduces the same difficulty that requires the use of two coils in a balanced bridge in the first place. A change in impedance is detected basically by comparing the sensing coil impedance with a reference. The change caused by a wheel is minor in character; environmental influences lead to comparable or even larger changes in the effective impedance of a typical sensing coil. The reference object or mechanism must be made to undergo analogous changes in order to avoid unintended imbalances. By far the best reference is another sensing coil subject to the same influences, the two-coil arrangement used in sensor 20. If the impedances of both coils is measured simultaneously, nothing remains to serve as a reference, so that the suggested monitoring scheme is essentially worthless.

The Basic Sensing Circuits of the Invention (FIGS. 3 through 11)

Not just one, but both of the methods of ambiguity resolution discussed immediately above can be instrumented while retaining the benefits of an intrinsically balanced reference by monitoring the characteristics of three coils, in two pairs, instead of a single pair of coils. A preferred arrangement utilizes three tuned coils L1, L2 and L3 incorporated in a non-magnetic housing 71 as a part of a wheel sensor 70 constructed in accordance with the present invention (FIGS. 3-6).

The physical characteristics of coils L1, L2 and L3 preferably correspond to those described above; that is, the coils have a relatively large surface area and are disposed with their axes vertically oriented so that the electromagnetic fields of the coils extend upwardly from housing 71 into the space traversed by the flange 27 of a railway wheel 28 moving along the head 26 of a rail 24 (FIGS. 3-5). The three coils L1-L3 are connected in a symmetrical pentagon bridge 80 as illustrated in FIG. 6, together with a voltage source schematically indicated by the oscillator or other signal generator 72. The coils L1, L2 and L3 are all electrically similar. A tuning capacitor C1 is connected in parallel with coil L1 to afford a tuned circuit having an operating frequency corresponding to the frequency of signal generator 72. Similarly, tuning capacitors C2 and C3 are connected in parallel with coils L2 and L3 respectively. This configuration places equal voltages across coils L1, L2 and L3 and subjects them as nearly as possible to the same external influences. For simplicity, it will be initially assumed that the coils are magnetically uncoupled with respect to each other.

In FIG. 6, the terminals of bridge 80 are designated by reference numerals 81, 82, 83, 84 and 85, proceeding clockwise from the common terminal 81 of the oscillator or other signal generator 72. The envelope of the output voltage appearing at terminal 83 is designated as voltage E1 in FIG. 7, which illustrates the voltage patterns for the signals developed at the bridge terminals during movement of a car wheel past sensor 70. The output or tap voltage produced at bridge terminal 84 is shown as voltage E2. As in the previous example, it is assumed that wheel 28 moves past sensor 70 in a direction such that it first disturbs the electromagnetic field above coil L1.

Assuming that movement of the wheel past coil L1 introduces a pure loss in the coil, the impedance of coil L1 is reduced and voltage E1 initially rises toward the excitation level +E for the signal supplied to coil L1 from oscillator 72. Simultaneously, signal voltage E2 rises, becoming smaller in magnitude, but the change in signal voltage E2 is actually approximately half that of signal voltage E1. With continued movement of the wheel, the disturbing influence extends significantly to coil L2 and substantially affects coil L2 to the greatest extent, and coils L1 and L3 to a lesser extent, when the wheel is approximately centered over coil L2. At this point the increase in voltage E1 has subsided; indeed, voltage E1 is now smaller in magnitude than its at-rest value, represented by the dash line 86. The impedances of coils L1 and L3 are equal while that of coil L2 is smaller; the voltages E1 and E2 are equal and both are smaller in magnitude than their at-rest values, dash lines 86 and 87. Thereafter, the initial pattern is repeated in reverse, with both signals tending in value toward the opposite-phase voltage −E from generator 72 and with the effect on E2 predominating.

The non-zero at rest values 86 and 87 of the tap voltages E1 and E2 taken from bridge terminals 83 and 84 are an inconvenience. The output voltages from the bridge can be simplified by either of the two circuit arrangements illustrated in FIGS. 8 and 9, both of which make use of voltage dividers having operating ratios that are stable and independent of the magnitude of the exciting signals. Thus, in FIG. 8, the output signal E1 from bridge terminal 83 is summed, in a summing amplifier 88, with a fraction of the excitation voltage −E supplied to bridge terminal 85. In the illustrated circuit, the summing ratio is 3:1. Similarly, the voltage E2 from bridge terminal 84 is summed with a corresponding fraction of the +E voltage from bridge terminal 82, in a summing amplifier 89. The output signals from amplifiers 88 and 89 are designated as signals E3 and E4, respectively.

The circuit of FIG. 9 performs a similar operation on a differential basis instead of a summation basis. Thus, in FIG. 9, the reference signal +E from bridge terminal 82 is applied to a resistor 91, the other end of resistor 91 being connected to a terminal 92. The reference signal −E is applied to a resistor 93 that is connected to a terminal 94. A resistor 95 is connected between terminals 92 and 94, the three resistors 91, 93 and 95 being of equal impedance. A differential voltage E5 is taken between bridge terminal 83 and terminal 92 in the circuit of FIG. 9. A second differential voltage E6 is derived across bridge terminal 84 and terminal 94 of the correction circuit.

Using either the circuit of FIG. 8 or that of FIG. 9, the modified signals E3–E6 are small A.C. voltages and must be amplified and demodulated to form convenient output signals. They may be used in essentially the generated form or may be combined to afford other useful output patterns.

FIG. 10A illustrates the result of amplification and synchronous demodulation of the output signals E3 and E4 produced by the summing signal circuit of FIG. 8; it is equally representative of the signals E5 and E6, respectively, produced by the differential circuit shown in FIG. 9. The polarities of signals E3 and E4, as illustrated in FIG. 10A, correspond to the relative phases of the output signals from amplifiers 88 and 89, respectively (FIG. 8). It will be seen that signals E3 and E4 are roughly similar to the output signals of a simple two-coil sensor, as illustrated in FIG. 2A, but are unsymmetrical and displaced from each other. The direction of motion of a wheel passing sensor 70 (FIGS. 3–6) can be distinguished from the polarity changes and from the asymmetry in both of the output signals E3 and E4. Furthermore, a substantial voltage exists in one or the other, and actually in both, of the signals E3 and E4 continuously during the complete time in which a wheel passes the sensor, effectively eliminating the directional ambiguity discussed above.

A preferred form of manipulation of the output signals from sensor 70 is shown in FIG. 10B. In FIG. 10B, signals E3 and E4 are summed algebraically to form a first operating signal E11. The same two signals are subtracted algebraically to provide a second operating signal E12, shown here in the form $$E12 = E4 - E3.$$

The operating signal E11 is the direct analog of the signal shown in FIG. 2A, from the simple two-coil sensor, and is generally quite similar to that signal. Considered as a time pattern, it reverses to a mirror image for a reverse direction of wheel movement. On the other hand, the difference operating signal E12 is independent of the direction of motion of the wheel and affords the same waveform for a reverse wheel movement. The operating signal E12 satisfies both requirements for an unambiguous supplemental signal.

By the utilization of appropriate threshold levels, as indicated in FIG. 10B by lines 95 and 96, the operating signals E11 and E12 can be utilized to afford a series of recognition signals 97, 98 and 99 (FIG. 10C). These recognition signals 97–99 satisfy both requirements for an unambiguous supplemental signal. Thus, one of the recognition signals is present at all times whenever a wheel is located at any point over sensor 70. Furthermore, there is a definite recognition signal 98 that exists during the transition period in which the wheel moves across the central portion of the sensor.

The recognition signals 97 and 99 are similar to those described above in connection with the previously known form of sensor and are obtained from the reversible sum pattern of output signals from the sensor bridge. The intermediate recognition signal 98 is derived only from the positive-going portion of the fixed difference pattern. This recognition signal pulse 98 is sustained throughout the transitional gap between the end recognition signals 97 and 99. Thus, a sequence 97, 98, 99 or a sequence 99, 98, 97 is generated and the presence of the pulse 98 between the pulses 97 and 99 positively identifies the pair of signals 97 and 99 that may be monitored to determine direction. The truncated sequence 98, 99, 97, 98, 99, 97 ... can readily be interpreted for a correct directional determination, while a full sequence 97, 98, 99, 97, 98, 99 ... unequivocally indicates movement of the wheel in the same direction. The reverse direction movement is accurately identifiable for any substantial grouping of pulses from the reversed sequence 99, 98, 97, 99, 98, 97.

Alternative schemes can exploit the overlap of the intermediate recognition signal 98 with respect to both of the end recognition signals 97 and 99, since the presence of the intermediate signal guarantees the existence of one signal at all times during passage of a wheel through the sensing region. Thus, recognition signal 98 can be used to validate a 97–99 sequence by acknowledging the recognition signals 97 and 99 only during the simultaneous presence of signal 98 or by acknowledging the inclusion of signal 98 during the simultaneous presence of either of the other two recognition signals 97 and 99.

Furthermore, both methods of utilization for the intermediate recognition signals 98 offer security in the form of potential redundancy. In the first method described above, in a normal sequence, a 97–98 recognition signal transition always must be followed by a 98–99 signal transition. In the second method, there are two signal overlaps, 97 and 98 and 98 and 99, during each wheel passage. Depending upon the probability of occurrence and the gravity of a missed detection or a false detection in a specific application, equipment utilizing the output from sensor 70 may be arranged to be satisfied with either one or both of the redundant recognition signal occurrences, greatly reducing the probability of missing a detection or making an incorrect detection. Furthermore, where essential, the equipment may be arranged to require the occurrence of both of the redundant recognition signal occurrences, positively excluding the consideration of isolated counterfeit pulses.

In an effective sensor the sensing coils L1, L2 and L3 are mounted in close proximity to each other; consequently, some mutual coupling of the magnetic fields of the coils is virtually unavoidable. Usually, the mutual coupling is small, of the order of a few percent in a typical sensor construction. However, the influence of the mutual coupling is not insignificant in comparison with the changes in impedance characteristics of the coils caused by operational imbalances, including those created upon the passage of a wheel or other metal object through the sensing space above the sensor.

The effect of this mutual coupling is undesirable in several ways. In the first place, the mutual coupling greatly complicates the process of tuning and balance adjustment of the three sensing coils L1–L3. In addition, the mutual coupling between coils constitutes an important difference in operating conditions between the center coil L2 and the two outer coils L1 and L3. This in turn, degrades stability by upsetting the desired uniformity in effect of environmental influences on the three coils. In addition, the mutual coupling between the sensing coils distorts the relative magnitudes and phase relationships of the operational voltages developed under conditions of imbalance, resulting in impaired sensitivity for the sensor and also producing less desirable output waveforms. Furthermore, the aiding-opposing coupling orientation of the coils that may be employed to ameliorate the tuning and balance problem and the distortion problem may intensify the sensitivity of the device to external interference.

The mutual coupling between adjacent coils, in sensor 70, can be substantially eliminated by connecting each outer coil to a compensating winding of a few turns about the central coil. The orientation of the compensating winding, in each instance, is such that the field of the compensating winding opposes the field of the principal part of the outer coil in the space occupied by the center coil L2. By this means, the coefficient of coupling between the center coil L2 and each of the outer coils L1 and L3 can readily be reduced by a factor of ten.

A winding arrangement of this kind is illustrated in FIG. 11. As shown therein, terminal 82 (see also FIG. 3) is connected to the main part of coil L1, which is wound around the core 101 in a counterclockwise direction. The main part of the coil L1 is not connected directly to the other coil terminal 83. Instead, a limited number of turns of coil L1, shown as a single turn, are extended around the core 102 of the center coil L2, the winding again proceeding in a counterclockwise direction and connecting to terminal 83. In a typical construction, using a basic coil construction of 100 turns for the main part of coil L1, the compensating winding for coil L1 on the core 102 of coil L2 may be two turns.

In the construction shown in FIG. 11, coil L2 includes the same number of turns as the main part of coil L1 and is connected directly to terminals 83 and 84, the direction of winding being counterclockwise from terminal 83 to terminal 84. In the example given above, the center coil L2 would include one hundred turns.

Coil L3 includes a main part wound upon a core 103, in a counterclockwise direction from terminal 84 to terminal 85, with the number of turns equal to the number of turns in the main part of coil L1 and to the total number of turns in coil L2. The main body of coil L3 is not directly connected to terminal 84; a compensating winding of very few turns is mounted upon the center coil core 102 between terminal 84 and the main part of the coil. Starting from terminal 84, therefore, in the given example, there would be two turns of coil L3 on core 102 and 100 turns of coil L3 on core 103.

The relatively weak fields produced by the compensating windings of coils L1 and L3 that are mounted upon the center core 102 are effective because of the close proximity of the compensating windings to the center coil L2. The total inductance and resistance of each of the outer coils is affected very little and the shape and intensity of the field of each outer coil, in the operating region immediately above that coil (see FIGS. 3 and 4) remains essentially unimpaired. Thus, the construction illustrated in FIG. 11, or any equivalent compensating winding arrangement, can be used effectively to eliminate the problems of detuning, instability, and distortion that would otherwise be created by mutual coupling between the sensor coils.

A Complete Sensor Constructed In Accordance with the Invention (FIG. 12)

FIG. 12 affords a block diagram of a complete sensor constructed in accordance with the invention and utilizing the principles discussed above in relation to FIGS. 3-11. The complete sensor circuit includes an oscillator and sensing bridge section 111, for which a complete circuit diagram is furnished in FIG. 13, a signal-processing section 112 that may be constructed in accordance with the detail circuit of FIG. 14, and an output section 113 for which a typical circuit is illustrated in FIG. 15.

The oscillator 72 incorporated in section 111 of the sensor 70, as illustrated in FIG. 12, includes a differential amplifier 115 equipped with negative feedback to enhance stability and positive feedback to provide the self-excitation necessary for oscillation, together with an automatic gain control to regulate amplitude. The sensing coils L1, L2 and L3, tuned to a predetermined operating frequency by the capacitors C1, C2 and C3, respectively, form a part of the positive feedback circuit for amplifier 115 in oscillator 72.

Thus, amplifier 115 has two differential outputs 116 and 117. A first negative feedback circuit 118 is connected from output 116 back to one input of amplifier 115. A second similar negative feedback circuit 119 connects output 117 back to another input of the oscillator amplifier. A resistor 121 is connected from amplifier output 116 to the first tuned sensing coil L1, at bridge terminal 82 (see FIG. 6). A similar resistor 122 is connected from the differential output 117 of amplifier 115 to coil L3, at bridge terminal 85. The impedances 121 and 122, together with the three tuned circuits formed by coils L1, L2, and L3 and capacitors C1, C2 and C3, are thus connected in series across the amplifier outputs 116 and 117. Terminals 82 and 85 are utilized as output terminals for oscillator 72 in connection with other circuits as described more fully hereinafter. Terminals 83 and 84, as before, constitute the tap voltage terminals for the bridge. The fifth bridge terminal 81 is a common terminal for amplifier 115.

The oscillator output signals appearing at terminals 82 and 85 have the characteristic that, because of the presence of the tuned circuit 120 comprising coils L1-L3 and C1-C3, they are near maximum and are in phase with the amplifier outputs 116 and 117 when the signal frequency for amplifier 115 is the natural frequency of the three tuned circuits. Impedance magnitudes are such that the amplitudes of the oscillator outputs are only slightly less than for the amplifier outputs at that frequency.

A positive feedback circuit 125 is connected from bridge terminal 82 back to an input circuit on the side of oscillator amplifier 115 opposite output 116. A similar positive feedback circuit 126 connects bridge terminal 85 to an input on the other side of amplifier 115. An automatic gain control circuit 127 is incorporated in the oscillator-bridge unit 111, the two inputs to AGC circuit 127 being derived from amplifier outputs 116 and 117 respectively. The AGC circuit has two outputs, one connected to each of the positive feedback circuits 125 and 126.

The signal processor unit 112 of sensor 70, as illustrated in FIG. 12, includes two signal combining networks 131 and 132. Network 131 has two inputs which are connected to bridge terminals 82 and 84. Network 132 is similar and has two inputs connected to bridge terminals 83 and 85. The output of network 131 is applied to an amplifier 133. The output signals from amplifier 133 is coupled to a difference or subtraction circuit 135 and is also applied to a summing or adder circuit 136. The output of combining network 132 is amplified by an amplifier 134, and is supplied to both the difference circuit 135 and the adder circuit 136. The output of the difference circuit 135 is amplified in an amplifier 137; an amplifier 138 is incorporated in the output of the summing circuit 136.

The output section 113 of sensor 70 includes a keying voltage generator 139 having two inputs that are connected to the bridge terminals 82 and 85. The keying voltage generator 139 generates a square wave signal that is supplied to one input of each of two synchronous detectors 141 and 142. Detector 141 has a second input that is connected to the output of the difference circuit amplifier 137 in signal processing section 112. Detector 142 derives its second input from the output of the summing circuit amplifier 138. Detector 141 is provided with an output amplifier 143 connected to an output terminal 145 for the sensor. Similarly, detector 142 is provided with an output amplifier 144 that is connected to a sensor output terminal 146.

In operation, oscillator 72 develops a continuous signals that is supplied, in phase opposition, to the two bridge terminals 82 and 85 at the opposite ends of the tuned sensing circuit 120. The positive feedback to oscillator amplifier 115 that is afforded by the positive feedback circuits 125 and 126 has the correct phase and adequate amplitude to sustain oscillation only at the natural frequency of the tuned sensing circuit 120, which is also the resonant frequency of each of the individual tuned sensing coil circuits. The AGC circuit 127 is adjusted to reduce the gain of the positive feedback circuits 125 and 126 to a value just capable of sustaining oscillation when the amplifier output reaches a prescribed amplitude level.

The oscillator construction illustrated in FIG. 12 affords a number of advantageous features in the operation of sensor 70. In the first place, the characteristics of amplifier 115, with its negative feedback, tend to be uniform and stable in the presence of environmental changes, thus enhancing the amplitude and frequency uniformity and stability, and assuring substantial purity in the output wave form of the oscillator. Secondly, AGC circuit 127 needs to exert only a moderate influence so that a relatively simple circuit can exercise adequate control with little in the way of adverse side effects. The only appreciable change tending to disturb operation of oscillator 72 is the very change in characteristics of the tuned sensing circuit 120 that is to be detected in operation of the sensor.

The oscillator construction illustrated in FIG. 12 has an additional advantage in that its output may be readily maintained in a well-balanced condition. Moreover, the circuit can be easily adapted to a variety of tuned circuits. It is not restricted to the specific series of three tuned coils L1, L2 and L3 used in the particular sensor 70.

As noted above, the tuned sensing circuit 120 comprises the three sensing coils L1, L2 and L3, each tuned to the same operating frequency by their capacitors C1, C2 and C3. The sensing coils are preferably furnished with compensating windings, as described in FIG. 11, that effectively cancel mutual coupling between the coils. The coils are oriented to be in aiding sense with respect to a remotely generated field. The undisturbed impedances of the three tuned coils are essentially identical so that the total oscillator output, which is the sum of the two oscillator signals +E and −E, is equally distributed across the three coils. The amplitudes of the two tap signals E1 and E2 appearing at bridge terminals 83 and 84 are each equal to one-third the amplitude of the total oscillator output.

The function of the signal processing unit 112 in sensor 70 is to convert the bridge tap signals E1 and E2 to combination signals of relatively large amplitude that depart from a predetermined "zero" level only upon occurrence of a meaningful imbalance in the impedances of the sensing coils L1, L2 and L3. Combining network 131 functions in the same manner as amplifier 89 (FIG. 8), adding signals +E and E2 in predetermined ratio to develop a signal E4, which is amplified in amplifier 133 and supplied to the succeeding circuits 135 and 136. Combining network 132, on the other hand, adds together signal −E and E1 from the bridge, in predetermined ratio, producing an output signal E3 that is amplified and supplied to circuits 135 and 136. The envelopes of the two operating signals E3 and E4 from combining networks 132 and 131 thus correspond to the wave forms illustrated in FIG. 10A.

In the circuit 135, signal E3 is subtracted from signal E4, producing an output signal of the form E4 −E3. The two signals are added together in circuit 136 to produce an output signal of the form E3 +E4. The sum and difference signals are supplied to the synchronous detectors 142 and 141, respectively, in output section 113.

In output section 113, the keying voltage generator 139 develops a square wave output, at the operating frequency of oscillator 72, that is supplied to the synchronous detectors 141 and 142. Synchronous detector demodulates and filters the sum imbalance signal E3+E4, developing an output signal that is further amplified by amplifier 144, and producing a sensor output signal E11 at terminal 146 having a wave form as illustrated in 10B. Similarly, synchronous detector 141 demodulates and filters the difference imbalance signal E4−E3, which is amplified in amplifier 143, and supplied to output terminal 145 as the different signal E12 (see FIG. 10B). The sum and difference signals E11 and E12 can readily be converted to the pulse recognition signals shown in FIG. 10C; as noted above, this conversion is preferably performed in the utilization equipment 68 connected to the outputs of sensor 70.

Figure 13:
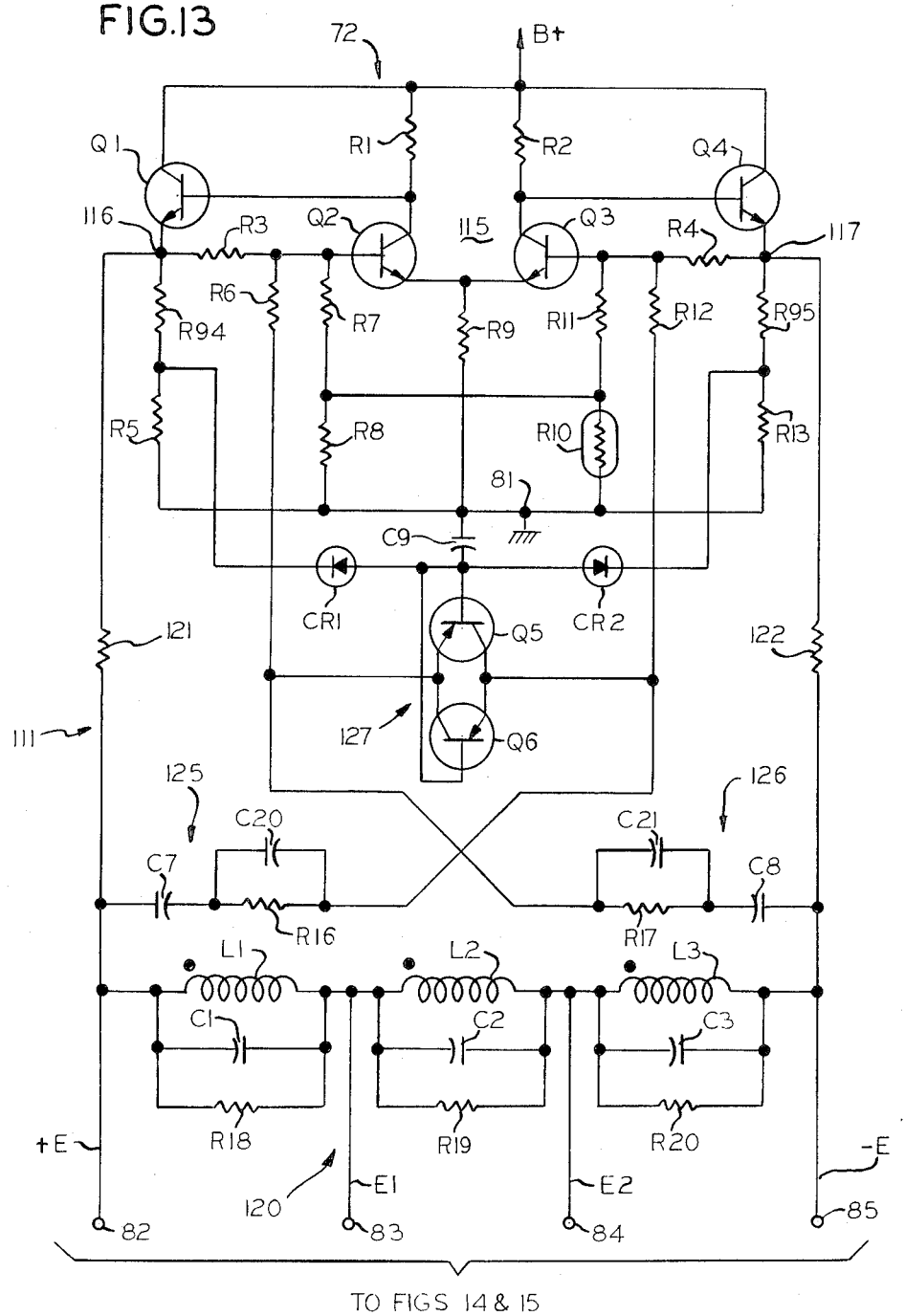
FIGS. 13, 14 and 15 are detailed schematic diagrams of the three principal components of the wheel sensor illustrated in FIG. 12.
Figure 14:
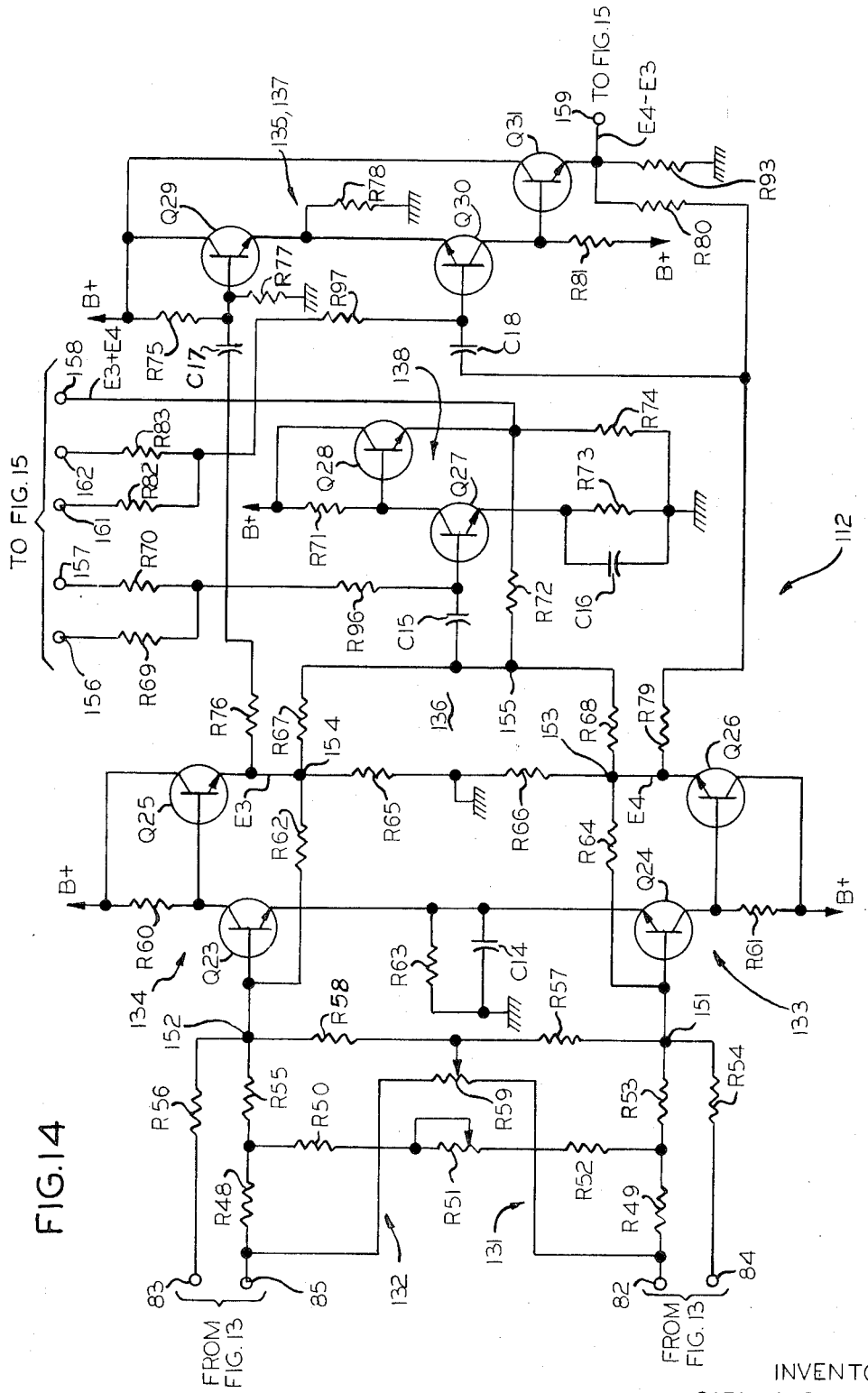
Figure 15:
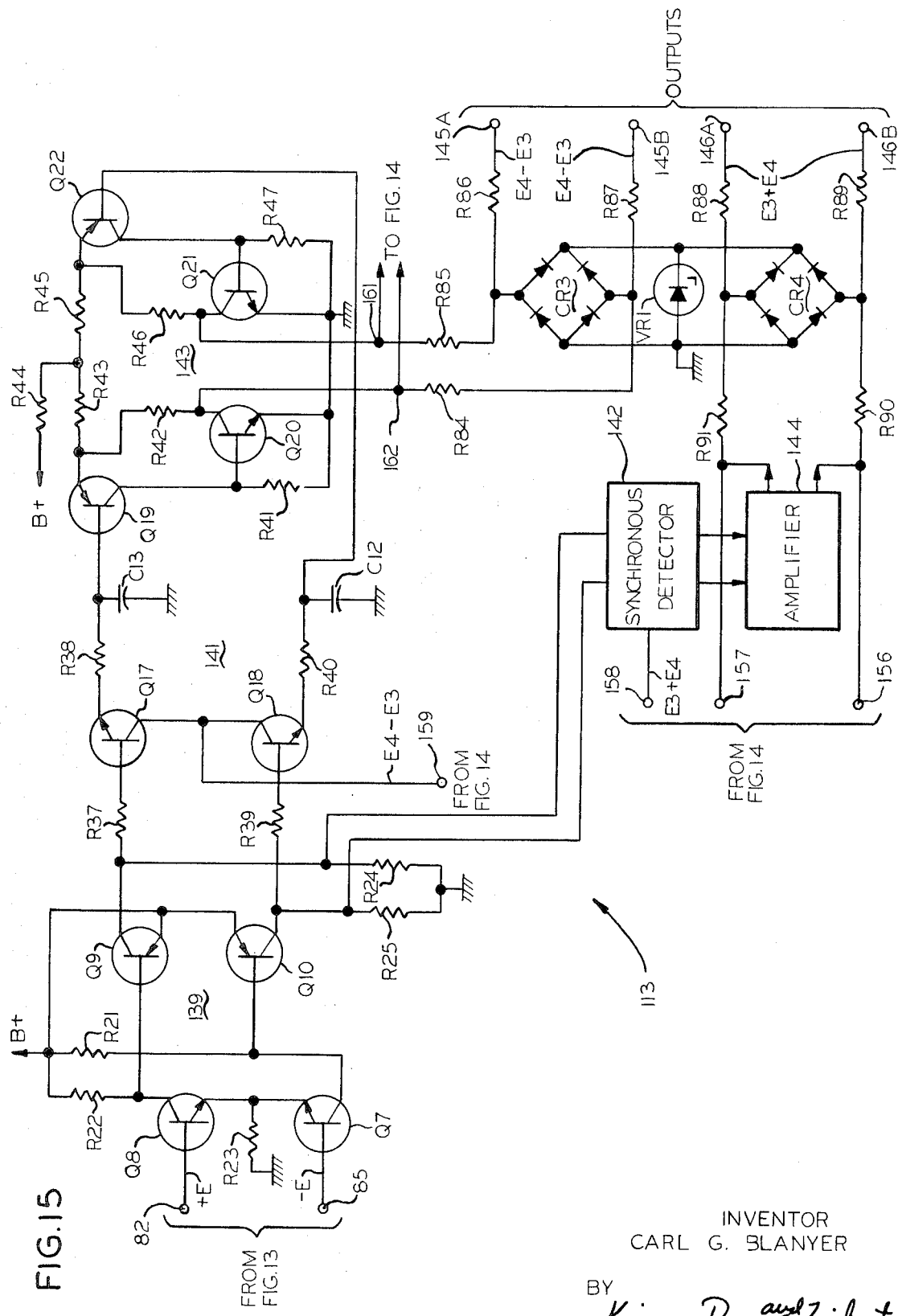

Specific Circuits (FIGS. 13-15)

FIG. 13 illustrates a specific circuit arrangement that may be employed for the oscillator and sensing bridge unit 111 in the sensor 70 of FIGS. 3-12. As shown therein, the amplifier 115 of oscillator 72 may comprise four transistors Q1, Q2, Q3 and Q4. The collectors of transistors Q1 and Q4 are connected to a suitable positive DC supply designated as B+. The emitter of transistor Q1 constitutes the amplifier output terminal 116 and the emitter of transistor q4 is the other output terminal 117. The base of transistor Q1 is connected to the collector of transistor Q2 and is returned to the B+ supply through a load resistor R1. The base of transistor Q4 is connected to the collector of transistor Q3 and is returned to the B+ supply through a resistor R2.

The base of transistor Q2 is connected to the emitter of transistor Q1, terminal 116, by a resistor R3. The base of transistor Q3 is connected to the emitter of transistor Q4, terminal 117, by a resistor R4. The emitter of transistor Q1 is returned to system ground, at bridge terminal 81, through the series combination of a resistor R94 and a resistor R5. Similarly, the emitter of transistor Q4 is returned to ground through the series combination of a resistor R95 and a resistor R13.

The base of transistor Q2 is connected to system ground through the series combination of two resistors R7 and R8. The base of transistor Q3 is returned to ground through a resistor R11 in series with a resistance R10. Resistance R10 is preferably a thermistor, used to compensate for the effects of temperature changes on the operating characteristics of other components. The junction between the resistors R7 and R8 is directly connected to the common terminal of resistors R11 and R10. The emitters of transistors Q2 and Q3 are connected together and are returned to system ground through a resistor R9.

In the circuit of FIG. 13, the AGC circuit 127 comprises two transistors Q5 and Q6, each having its collector connected to the emitter of the other transistor. The base of transistor Q5 is connected to a capacitor C9 that is returned to system ground, and is also connected to the junction of resistors R5 and R94 through a diode CR1. The base of transistor Q5 is also connected to the common terminal of resistors R95 and R13 through a diode CR2. The bases of the two transistors Q5 and Q6 are connected to each other. The emitter of transistor Q5 and the collector of transistor Q6 are connected to the base of transistor Q2 through a resistor R6. Similarly, the base of transistor Q5 and the emitter of transistor Q6 are connected to the base of transistor Q3 through a resistor R12.

The positive feedback circuit 125, in FIG. 13, comprises the parallel combination of a resistor R16 and a capacitor C20. One end of the RC circuit is connected to bridge terminal 82 through a capacitor C7. The other terminal of the RC circuit is connected to the resistor R12. The other positive feedback circuit 126 comprises a parallel RC circuit including a resistor R17, and a capacitor C21, connected to bridge terminal 85 by a capacitor C8 and connected back to resistor R6.

The connections for the resonant sensing unit 120 in FIG. 13 correspond to those illustrated in the block diagram of FIG. 12. Three trimming resistors R18, R19 and R20 are shown connected in parallel with coils L1, L2 and L3.

In operation of the differential amplifier 115, negative feedback is provided through the precision resistors R3 and R4. Balanced outputs from the amplifier appear at the emitters of transistors Q1 and Q4, at terminals 116 and 117. The oscillator output is applied to the tuned circuit 120, at bridge terminals 82 and 85, through the resistors 121 and 122.

Positive feedback paths are established through resistors R16 and R12 on one side of oscillator amplifier 115 and through resistors R17 and R6 on the other side. Capacitors C7 and C8 serve as blocking capacitors for DC voltages, while capacitors C20 and C21 serve to correct small residual phase shifts.

The transistors Q5 and Q6 in AGC circuit 127 function as variable resistance elements that attenuate the positive feedback for amplifier 115. The two diodes CR1 and CR2, together with capacitor C9, sample a portion of the amplifier output to generate a control voltage for the AGC transistors. The trimming resistors R18, R19 and R20 are selected as necessary to correct for minor variations in the three tuned sensing coil circuits that make up the tuned sensing unit 120. Additional trimming capacitors may also be necessary to establish an accurate balanced condition in the sensing bridge.

FIG. 14 affords a complete schematic diagram for a circuit that may be employed as the signal processor unit 112 (FIG. 12). The two signal-combining networks 131 and 132, in the circuit of FIG. 14, are formed by 12 resistors R48 through R59. One terminal of resistor R48 is connected to the bridge terminal 85 and the other terminal of resistor R48 is connected to one end of a resistor R49 through the series combination of a resistor R50, a potentiometer R51, and a resistor R52. The other end of resistor R49 is connected to bridge terminal 82. Bridge terminals 82 and 85 are also connected to the opposite ends of the potentiometer R59.

Bridge terminal 83 is connected to a resistor R56, the other end of resistor R56 being connected to a terminal 152 that constitutes the output terminal for combining network 132. Terminal 152 is connected to resistor R48 through a resistor R55 and is also connected to the adjustable tap on potentiometer R59 by a resistor R58. In combining network 131, bridge terminal 84 is connected through a resistor R54 to an output terminal 151. Terminal 151 is connected to resistor R49 by a resistor R53 and is also connected through a resistor R57 to the tap on potentiometer R59.

The amplifier 133, in the circuit of FIG. 14, comprises two transistors Q24 and Q26. The base of transistor Q24 is connected to the output terminal 151 of combining network 131. The emitter of transistor Q24 is returned to system ground through the parallel combination of a resistor R63 and a capacitor C14. The collector of transistor Q24 is connected to the B+ supply through a load resistor R61 and is also connected to the base of the second stage transistor Q26.

Transistor Q26 is incorporated in an emitter follower stage. The collector of transistor Q26 is connected to the B+ supply. The emitter is returned to ground through a load resistor R66. A feedback connection is afforded by a resistor R64 connected from the emitter of transistor Q26 to the base of transistor Q24. The output of amplifier 133 is taken at the emitter of transistor Q26, at terminal 153.

Amplifier 134 corresponds in construction to amplifier 133. It includes a first stage transistor Q23 having its base connected to the output terminal 152 of combining network 132 and having its emitter returned to ground through the RC circuit comprising resistor R63 and capacitor C14. The collector of transistor Q23 is connected to the B+ supply through a resistor R60 and is connected to the base of an emitter follower transistor Q25. The collector of transistor Q25 is connected to the B+ supply and the emitter is connected to ground through a load resistor R65. The output terminal 154 of amplifier 134 corresponds to the emitter of transistor Q25 and is connected back to the base of transistor Q23 through a feedback resistor R62.

In FIG. 14, the adder circuit 136 comprises a pair of resistors R67 and R68 connecting terminals 154 and 153 respectively to a common terminal 155. Terminal 155 is coupled, through a capacitor C15, to a transistor Q27 comprising the first stage of the adder circuit amplifier 138. The emitter of transistor Q27 is returned to ground through a parallel RC circuit comprising a resistor R73 and a capacitor C16. The collector of transistor Q27 is connected to the B+ supply through a load resistor R71. The base of transistor Q27 is connected to a resistor R96 that is in turn connected to a resistor R69 leading to a terminal 156 and to a resistor R70 connected to a terminal 157; resistors R69, R70 and R96 form a part of a stabilization circuit described more fully hereinafter in connection with FIG. 15.

Amplifier 138 includes a second transistor Q28 having its base connected to the collector of transistor Q27. This is an emitter follower stage, the collector of transistor Q28 being connected to the B+ supply and the emitter being returned to ground through a load resistor R74. The output from amplifier 138 is taken from the emitter, which is connected to a terminal 158 that connects to the output circuits of FIG. 15 as described below. A negative feedback resistor R72 is connected from the emitter of transistor Q28 back to the amplifier input terminal 155.

The difference circuit 135 and amplifier 137, in the form illustrated in FIG. 14, comprise a resistor R76 connected from the output terminal 154 of amplifier 134 to a coupling capacitor C17 in turn connected to the base of a transistor Q29. The base of transistor Q29 is also connected to a resistor R75 that is returned to the B+ supply and to a resistor R77 returned to ground. The collector of transistor Q29 is connected to the B+ supply and the emitter is connected to a resistor R78 that is returned to ground.

The difference circuits 135, 137 also include a resistor R79 that is connected to the output terminal 153 of amplifier 133 and to a coupling capacitor C18 that is connected to the base of a transistor Q30. The emitter of transistor Q30 is connected to resistor R78. The collector of transistor Q30 is connected to a load resistor R81 which is in turn connected to the B+ supply.

The output stage of amplifier 137 comprises a resistor Q31 having its base connected to the collector of transistor Q30. The collector of transistor Q31 is connected to the B+ supply. The emitter is connected to a resistor R80 that is in turn connected back through the resistor R79 to the output terminal 153 of amplifier 133. The emitter of transistor Q31 is also connected to a load resistor 93 that is returned to ground and to an output terminal 159 that is connected to the output unit 113 of FIG. 15.

The difference circuits 135, 137 of FIG. 14 also include a stabilization circuit comprising a resistor R97 that has one end connected to the base of transistor Q30. The other end of resistor R97 is connected through a resistor R82 to a terminal 161 and is also connected through a resistor R83 to a terminal 162.

The origin of the stabilization circuit is discussed hereinafter in connection with FIG. 15.

As noted above, resistors R48 through 59 form the two combining networks 131 and 132 that develop the two operating signals E3 and E4. The variable resistors R51 and R59 serve for final small adjustment of the difference signal and the sum signal, respectively. These variable elements are preferably arranged for access to permit adjustment of the sensor field after installation.

The two amplifier circuits 133 and 134 are of conventional construction, so that their operation need not be described in detail. The outputs from these two amplifiers are imbalance signals that have a value of zero when the circuits are balanced. The signals throughout processing circuit 112, FIG. 14, are alternating current signals at the oscillator frequency which, using the components listed hereinafter, would be approximately 13 Khz. They are subsequently converted to D.C. signals in the output unit 113 illustrated in FIG. 15.

FIG. 15 affords a detail circuit diagram of the output circuit unit 113, in a construction that is suitable for use with the circuits described above in connection with FIGS. 13 and 14. As shown in FIG. 15, the keying voltage generator 139 comprises four transistors Q7, Q8, Q9 and Q10. The base of transistor Q8 is connected to bridge terminal 82 (FIG. 13) and the base of transistor Q7 is connected to bridge terminal 85, so that the oscillator signal is supplied to the bases of each of these two transistors in phase opposition. The emitters of transistors Q7 and Q8 are connected together and are returned to ground through a resistor R23. The collector of transistor Q7 is connected to a load resistor R21 that is returned to the B+ supply and is also connected to the base of transistor Q10. The collector of transistor Q8 is connected to a resistor R22 that is returned to the B+ supply and is also connected to the base of transistor Q9.

The emitters of the two transistors Q9 and Q10, which constitutes the output stage of the keying voltage generator 139, are both connected to the B+ supply. The collector of transistor Q9 is connected to a load resistor R24 that is returned to ground. The collector of transistor Q10 is connected through a load resistor R25 to ground.

The difference signal synchronous detector 141, in the form illustrated in FIG. 15, comprises two transistors Q17 and Q18. The information signal input to synchronous detector 141 is taken from terminal 159 (FIG. 14), which is connected to the collectors of the two transistors Q17 and Q18. The base electrode of transistor Q17 is connected to the collector of transistor Q9 in the output stage of keying voltage generator 139 by means of a resistor R37. Similarly, a resistor R39 connects the base of transistor Q18 to the collector of transistor Q10 in the keying voltage generator.

The emitter of transistor Q17 is connected to a filter comprising a series resistor R38 and a shunt capacitor C13 that is returned to ground, the filter being connected to the base electrode of a transistor Q19 in the output amplifier 143. A second output from detector 141 is derived from the emitter of transistor Q18, through a filter comprising a resistor R40 and a shunt capacitor C12, the filter being connected to the base of a second input transistor Q22 in amplifier 143.

Amplifier 143 is a symmetrical differential output amplifier, including two output transistors Q20 and Q21 as well as the input transistors Q19 and Q22. The emitter of transistor Q19 is connected to a resistor R43 that is in turn connected to a resistor R44 connected to the B+ supply. The emitter of transistor Q22 is connected to a resistor R45 and then to a B+ supply through resistor R44. The collector of transistor Q19 is connected to the base of transistor Q20 and is also connected to a load resistor R41 that is returned to system ground. The collector of transistor Q22 is connected to the base of transistor Q21 and is also connected to a resistor R47 that is returned to system ground.

The emitters of transistors Q20 and Q21 are each connected directly to system ground. The collector of transistor Q20 is connected to a resistor R42 that is returned to the B+ supply through the resistors R43 and R44. The collector of transistor Q21 is connected to a resistor R46 that is in turn connected to the B+ supply through the series combination of resistors R45 and R44.

Two outputs are derived from amplifier 143, one taken from the collector of transistor Q20 and the other from the collector of transistor Q21. These outputs could be utilized directly but, in the illustrated preferred construction, are connected to auxiliary protective circuits. Thus, the output terminal 161 of amplifier 143 that is connected to the collector of transistor Q21 is connected through two series resistors R85 and R86 to a first difference output terminal 145A. The output terminal 162 of amplifier 143 that is connected to the collector of transistor Q20 is connected through the series combination of a resistor R84 and a resistor R87 to a second difference output terminal 145B. A diode bridge CR3 is connected across the two output circuits, from the common terminal of resistors R85 and R86 to the common terminal of resistors R84 and R87.

The construction of the sum signal synchronous detector 142 may be essentially identical to that of detector 141 and hence has not been shown in detail in FIG. 15. Detector 142 receives two inputs from keying voltage generator 139, taken from the collectors of the output transistors Q9 and Q10 in the keying voltage generator. The signal information input to detector 142 is derived from the output terminal 158 of amplifier 138 (FIG. 14). The outputs from detector 142 are supplied to amplifier 144, which may correspond fully in construction to amplifier 143 and hence has not been shown in detail. Amplifier 144 has two output terminals 156 and 157. Terminal 156 is connected to one sum output terminal 146B through the series combination of two resistors R90 and R89. Amplifier terminal 157 is similarly connected to a second sum output terminal 146A through the series combination of a resistor R91 and a resistor R88. A diode bridge CR4 is connected across the sum signal output afforded by terminals 146A and 146B, being connected from the common terminal of resistors R88 and R91 to the common resistors R88 and R91 to the common terminal of resistors R89 and R90.

A voltage regulator diode VR1 is connected to the two diode bridges CR3 and CR4 and is provided with a ground connection.

In the operation of the output circuit unit 113 of FIG. 15, the keying voltage generator 139 develops two square wave outputs, across resistors R24 and R25, that are supplied to the synchronous demodulators 141 and 142. These demodulating signals have a frequency equal to the oscillator frequency and are controlled by oscillator 72 through the inputs derived from bridge terminals 82 and 85.

Synchronous demodulator 141, comprising transistors Q17 and Q18 and the succeeding filters, has somewhat unusual operating characteristics. This circuit operates from a single information signal input, supplied from amplifier 137 (FIG. 14), and produces two balanced differential D.C. outputs across the filter capacitors C12 and C13. The filters are arranged to be lightly loaded by the following circuit, amplifier 143. Although each section of demodulator 141 consists only of a single transistor and is a halfwave circuit, nevertheless, because the transistor goes non-conductive during the inactive half cycle and hence does not discharge its output filter capacitor, the output voltage across each filter capacitor is essentially equivalent in amplitude to that of a fullwave circuit.

The symmetrical differential output amplifier 143 affords an output signal, at terminals 161 and 162, comprising a differential voltage with a common-mode voltage level of about 2.2 volts, in a typical installation. One of the two output voltages rises and the other falls to generate a differential output. Full output occurs when one of these voltages falls nearly to zero and the other rises to approximately double the common-mode voltage. The sum of the two voltages is obtained in the adding network afforded by resistors R82 and R83, which are connected to output terminals 161 and 162 as indicated in FIG. 14; the sum voltage is of course equal to the common-mode voltage. This sum voltage is fed back through resistor R97, FIG. 14, to the base of transistor Q30 in the preceding amplifier stage 137 and acts to stabilize the operating point of the output amplifier. The same mode of operation obtains with respect to synchronous detector 142 and amplifier 144, since these circuits are the same as detector 141 and amplifier 143 respectively.

The auxiliary circuits interposed between amplifiers 143 and 144 and the sensor output terminals 145A through 146B are employed to protect the internal circuits of the sensor from externally generated surges and misconnections. For the difference outputs 145A and 145B, resistors R84 through R87 are utilized as current limiting impedances. Two of the diodes in the bridge CR3 prevent the voltages in the output path from becoming negative while the other two diodes, in conjunction with the voltage regulation diode VR1, prevent the output voltages from exceeding a predetermined level, in this instance approximately five volts. The resistors R88 through R91, diode bridge CR4 and voltage regulator NR1 serve the same function for the outputs from amplifier 144.

Considering again the overall operation of sensor 70, the installation of the sensor, when utilized for the detection of the passage of railway wheels, corresponds to that illustrated in FIGS. 3–5, with the coils L1, L2 and L3 arranged in line along the path of movement of the wheel and with their axes normal to that path so that a passing wheel traverses the coils, in order, with about the same relation to each coil during passage. The height of the sensor is adjusted to allow clearance below the path taken by the flange 27 of a wheel 28. Allowance is made for the variable depth of flange resulting from wheel wear and, indeed, for the extreme depth sometimes encountered in wheels worn beyond the normal rejection limit, but still in service. The lateral position of sensor 70 is chosen to place the wheel flange over the sensor coils at the extreme inner and outer limits of wheel position relative to the head of the rail.

The interlocking fields of the coils L1, L2 and L3, best shown in FIGS. 3 and 4, extend into the space above the sensor that is occupied by the wheel flange and even by a part of the wheel tread when the wheel moves past the sensor. The presence of this metallic mass couples energy from the coils and thus acts to increase losses in the coils. The primary effect, in the bridge circuit comprising sensing coils L1, L2 and L3, is an effective lowering of the Q factor of the coils and hence a reduction in the effective tuned impedance of the coils. The magnetic properties of the wheel have a secondary effect in introducing a reactive element in the sensing coil circuits; however, this effect generates principally a quadrature signal, 90° out of phase with the oscillator output, to which the sensor circuitry exhibits little response.

In order to afford a more complete example of a preferred embodiment of the invention, specific circuit data for the construction illustrated in FIGS. 13–15 is set forth hereinafter. It should be understood that this information is presented merely by way of illustration and in no sense as a limitation on the invention.

RESISTORS

| | |
|---|---|
| 121, 122 | 200 ohms |
| R1, R2 | 4.02 kilohms |
| R3, R4 | 15 kilohms |
| R5, R13 | 820 ohms |
| R6, R12 | 2.2 kilohms |
| R7, R11 | 12.1 kilohms |
| R8 | 3.3 kilohms |
| R9 | 1.21 kilohms |
| R10 | 3.0 kilohms, 25°C. |
| R16, R17 | 9.09 kilohms |
| R21, R22, R78 | 6.8 kilohms |
| R23 | 12 kilohms |
| R24, R25 | 47 kilohms |
| R37, R39, R50, R52, R67, R68 | 15 kilohms |
| R38, R40 | 22 kilohms |
| R41, R47, R48, R49, R53, R54, R55, R56, R63 | 20 kilohms |
| R42, R46 | 510 ohms |
| R43, R45 | 240 ohms |
| R44 | 300 ohms |
| R51, R96, R97 | 10 kilohms |
| R57, R58 | 1.5 megohms |
| R59 | 100 kilohms |
| R60, R61, R76 | 24 kilohms |
| R62, R64, R72 | 62 kilohms |
| R65, R66, R74, R93 | 3.9 kilohms |
| R69, R70, R82, R83 | 220 kilohms |
| R71, R81 | 33 kilohms |
| R73 | 13 kilohms |
| R75 | 430 kilohms |
| R77, R80 | 150 kilohms |
| R79 | 16 kilohms |
| R84, R85, R90, R91 | 47 ohms |
| R86, R87, R88, R89 | 100 ohms |
| R94, R95 | 330 ohms |

CAPACITORS AND COILS

| | |
|---|---|
| L1, L2, L3 | 1.5 millihenry, nominal |
| C1, C2, C3 | 0.1 microfarad |
| C7, C8, C14, C16 | 1 microfarad |
| C9, C15, C18 | 0.01 microfarad |
| C12, C13 | 0.022 microfarad |
| C20, C21 | 22 picofarad |

SEMICONDUCTOR DEVICES

Transistors Q5, Q6, Q9, Q10, Q22, 2N3906
All other transistors are in integrated circuits, RCA CA 3045

| | |
|---|---|
| CR1, CR2 | IN 4446 |
| CR3, CR4 | MDA 920A-1 |
| VR1 | 1N5338 |

VOLTAGE SUPPLY

| | |
|---|---|
| B+ | +8.5 volts |

Sensor 70, as described above, can function over a broad temperature range including ambient temperatures up to 130°F under direct sunlight; the sensor itself will be substantially hotter. For low temperature operation, heaters can be installed within the sensor housing. For many applications heaters are unnecessary because the solid state electronic components preferably used for the operating circuits of the sensor can function at quite depressed temperatures, down to at least 0°F, without auxiliary heaters.

In the construction of sensing coils L1, L2 and L3, there is no need for magnetic cores or for external pole pieces, shells, or other magnetic guiding structures. These coils are preferably constructed with a thin, flat configuration; the fields of the coils cannot be usefully extended or concentrated at a distance from the coil by auxiliary core or shell means. In a railroad wheel sensing application the coils should be mounted vertically; the coils should be relatively large in horizontal dimensions to cover the full range of possible flange locations. On the other hand, a large axial dimension for the sensing coils is of no assistance and may tend to reduce coil sensitivity. Individually tuned coils, as illustrated, afford adequate sensitivity and other operating virtues. On the other hand, high Q coils are not particularly desirable because they tend to be unduly sensitive and to produce erroneous signals when their fields are disturbed by factors other than the passage of a metal object such as a wheel flange. The resistors connected in parallel with the coils are employed to adjust the Q of the coils to a relatively low level, e.g., 10 to 14.

With a symmetrical bridge circuit of the kind described, close tracking between the components in corresponding branches of the bridge is adequate and absolute stability with changes in environmental factors such as temperature, aging, humidity and the like is unnecessary. A shift in the reactance of one of the sensing circuits primarily causes a shift in the quadrature null of the bridge, which is ignored by the synchronous detectors of the sensor. Structural rigidity of the coils is not critical; some minor bending or other physical distortion may be tolerated without introduction of substantial possibility of error. The overall circuitry requires no transformers, a factor of substantial assistance in maintaining a high degree of symmetry in the balanced driving signals for the bridge.

I claim:

1. A sensor for sensing the passage of a metal object moving along a given path, comprising:

at least three electrical sensing coils, all tuned to a given operating frequency, electrically connected in series with each other in consecutive arms of a bridge circuit, said sensing coils being positioned in series along said path with their axes parallel to each other and normal to said path;

excitation means, incorporated in two remaining arms of the bridge, for applying an excitation signal, at said operating frequency, in phase opposition to the two end sensing coils of said series so that each sensing coil generates an electromagnetic field intersecting said path;

signal processing means, connected to the bridge terminals intermediate said sensing coils, for additively combining the signals developed at different terminals of said bridge to produce at least two operating signals having amplitude variations indicative of the sequence of disturbance of the fields of said sensing coils by a metal object moving along said path;

and synchronous detector means, coupled to said signal processing means and said excitation means, for demodulating said operating signals to produce at least two output signals indicative of the direction and velocity of said metal object.

2. A metal object sensor according to claim 1, in which said signal processing means includes a first signal combining network for additively combining the excitation signal of one phase in predetermined amplitude ratio with the tap signal developed at one bridge terminal intermediate said sensing coils, and a second signal combining network for additively combining the excitation signal of opposite phase in predetermined ratio with the tap signal developed at another bridge terminal intermediate said sensing coils.

3. A metal object sensor according to claim 2, comprising just three tuned sensing coils connected consecutively to afford, in sequence, a first excitation terminal, a first tap terminal intermediate the first two coils, a second tap terminal intermediate the last two coils, and a second excitation terminal, and in which said first signal combining network is connected to the first excitation terminal and the second tap terminal and said second signal combining network is connected to the second excitation terminal and the first tap terminal.

4. A metal object sensor according to claim 3, in which the combining ratio of excitation signal amplitude to tap signal amplitude, in each combining network, is 1:3.

5. A metal object sensor according to claim 3, in which said signal processing means further comprises a summing circuit for adding the output signal E3 of said first signal combining network to the output signal E4 of said second signal combining network to develop a first operating signal of the form E3 + E4 comprising two pulses identifying the presence of a metal object over the two end sensing coils, respectively, and a null identifying the presence of a metal object centered over the center sensing coil, the two pulses occurring in reverse order for reversed movement of a metal object past said sensor.

6. A metal object sensor according to claim 5, in which said signal processing means further comprises a difference circuit for subtracting the output signal of one combining network from the output signal of the other to develop a second operating signal of the form E4—E3 comprising a pulse positively identifying the presence of a metal object over the center sensing coil, and having a shape independent of the direction of movement of the metal object along said path.

7. A metal object sensor according to claim 6, in which said second operating signal overlaps both pulses in said first operating signal, for passage of a metal object along said path in either direction.

8. A metal object sensor according to claim 3, in which each end sensing coil includes a compensating winding, wound upon the center coil, each compensating winding including a much smaller number of turns than the main part of the coil, said compensating windings effectively compensating for mutual field coupling between adjacent coils.

* * * * *